US010693870B2

(12) United States Patent
Inabe et al.

(10) Patent No.: US 10,693,870 B2
(45) Date of Patent: Jun. 23, 2020

(54) AUTHENTICATION SYSTEM

(71) Applicant: SystemMetrix Co., Ltd., Nagoya-shi, Aichi-ken (JP)

(72) Inventors: Takahiro Inabe, Nagoya (JP); Yoshio Maeda, Nagoya (JP)

(73) Assignee: SystemMetrx Co., Ltd., Nagoya-shi (JP)

(*) Notice: Subject to any disclaimer, the term of this patent is extended or adjusted under 35 U.S.C. 154(b) by 0 days.

(21) Appl. No.: 16/175,591

(22) Filed: Oct. 30, 2018

(65) Prior Publication Data
US 2019/0068588 A1    Feb. 28, 2019

Related U.S. Application Data

(63) Continuation of application No. PCT/JP2017/011449, filed on Mar. 22, 2017.

(51) Int. Cl.
  *H04L 29/06* (2006.01)
  *G06F 21/12* (2013.01)
  *G06F 9/445* (2018.01)

(52) U.S. Cl.
  CPC .......... *H04L 63/0853* (2013.01); *G06F 9/445* (2013.01); *G06F 21/121* (2013.01); *H04L 63/0807* (2013.01); *H04L 63/108* (2013.01)

(58) Field of Classification Search
  CPC ............. H04L 63/0853; H04L 63/0807; H04L 63/108; G06F 9/445; G06F 21/121;
  (Continued)

(56) References Cited

U.S. PATENT DOCUMENTS 7,315,386 B1 * 1/2008 Shiimori .................. G06F 3/14
                                                                                358/1.15
9,197,642 B1 * 11/2015 Urbach ..................... H04L 63/10
(Continued)

FOREIGN PATENT DOCUMENTS

EP       3035270 A1 *  6/2016  ......... G06Q 20/3226
JP    2016-018529 A     2/1916
(Continued)

OTHER PUBLICATIONS

Takako Nonaka, et al., Secure personal authentication system for home network, Dec. 2010, 2010 10th International Conference on Intelligent Systems Design and Applications, pp. 1-4.*
(Continued)

*Primary Examiner* — Farid Homayounmehr
*Assistant Examiner* — Raied A Salman
(74) *Attorney, Agent, or Firm* — Bayer Law Group LLP (57) ABSTRACT

A server performs authentication, in response to an authentication request from a client PC and issues a token, when the user of an application is permitted. When the client PC needs to use the application in an offline state, the client PC requests the server to change over to a standalone mode. The server then changes the issued token to an offline token that is valid for a predetermined time period. The offline token includes dynamic date and time information that is updated on every occasion of authentication, as well as static information indicating a validity period. Including the dynamic date and time information prevents illegal use of the token by causing the client PC's timepiece to go back in time after expiration of the validity period. This configuration enables an online authentication system to be used offline, while preventing illegal use, taking advantages of both online and offline authentications.

12 Claims, 6 Drawing Sheets

(58) Field of Classification Search
CPC ............... G06F 21/31; G06Q 20/3227; G06Q 20/3829; G06Q 20/34; G06Q 20/238
See application file for complete search history.

(56) References Cited

U.S. PATENT DOCUMENTS

| | | | |
|---|---|---|---|
| 2003/0187885 A1* | 10/2003 | Miyazaki | G06F 16/10 |
| 2006/0021015 A1* | 1/2006 | Chambers | B60R 25/24 |
| | | | 726/9 |
| 2015/0134538 A1* | 5/2015 | Kim | G06Q 20/04 |
| | | | 705/71 |
| 2015/0188910 A1 | 7/2015 | Tsai | |
| 2015/0254441 A1* | 9/2015 | Sanso | G06F 21/41 |
| | | | 726/9 |
| 2015/0302186 A1* | 10/2015 | Suzuki | G06F 21/31 |
| | | | 726/17 |
| 2017/0214683 A1* | 7/2017 | Kroehling | H04L 63/0807 |
| 2018/0375859 A1* | 12/2018 | Huh | H04L 9/0894 |

FOREIGN PATENT DOCUMENTS

| | | | | |
|---|---|---|---|---|
| JP | H08-181965 A | | 7/1996 | |
| JP | 2004-46756 A | | 2/2004 | |
| JP | 2009-116392 A | | 5/2009 | |
| JP | 2013-015930 A | | 1/2013 | |
| JP | 2015-014817 A | | 1/2015 | |
| JP | 2015-207152 A | | 11/2015 | |
| JP | 2015207152 A | * | 11/2015 | ............. G06F 21/31 |
| WO | 2013-126615 | | 8/2013 | |

OTHER PUBLICATIONS

WeiYi Liu, et al., Service token for identity access management, Dec. 7-11, 2009, 2009 IEEE Asia-Pacific Services Computing Conference (APSCC), pp. 34-39.*
International Search Report for International Application No. PCT/JP2017/011449 dated Jun. 27, 2017.

* cited by examiner

AUTHENTICATION SYSTEM

CLAIM OF PRIORITY

This application is a Continuation of International Patent Application No. PCT/JP2017/011449, filed on Mar. 22, 2017, which claims priority to Japanese Patent Application No. 2016-101166, filed on May 20, 2016, each of which is hereby incorporated by reference.

BACKGROUND OF THE INVENTION

1. Field of the Invention

The present disclosure relates to an authentication system that performs authentication to use an application in a client connected with a server via a network.

2. Description of the Related Art

During use of an application, authentication is performed by various methods to verify whether a user has a license for using the application. In recent years, a number of techniques has been proposed for management of the license by a server on the Internet, on the premise that a client using the application is in an environment connected to the Internet.

For example, Japanese Patent Laid-Open Publication No. 2013-015930A discloses a technique that obtains terminal-specific identification information in the process of authentication of an application via a network, so as to prevent the use of the application by any unauthorized terminal other than authorized terminals.

Japanese Patent Laid-Open Publication No. 2009-116392A discloses a technique that manages identification information of each terminal using an application in the form of a database in the process of authentication using a license key including terminal-specific identification information and that in the case of authentication in a different terminal, stops the use of the application in a previous terminal and subsequently permits the use of the application in a new terminal.

Japanese Patent Laid-Open Publication No. 2015-14817A discloses a technique that provides two set values, i.e., the number of terminals allowed to install an application and the number of licenses allowed to simultaneously start the application at the time of licensing and thereby controls both the number of terminals which the application is installed and the number of terminals which are operated simultaneously.

Japanese Patent Laid-Open Publication No. 2016-018529A discloses a technique that issues an access token with a term of validity in the process of authentication by the server and confirms whether the term of validity of the access token does not expire to authenticate a license during the use of an application.

BRIEF DESCRIPTION OF THE INVENTION

With regard to the prior art authentication method, in the case of the online-based authentication by the server as described in Japanese Patent Laid-Open Publication Nos. 2013-015930A, 2009-116392A, JP 2015-14817A, and 2016-018529A, the client in which an application is installed is unable to use the application unless the client is online to be connected with the server in a communicable manner. Employing a method that allows for authentication even in an offline state that the client is not connected with the server increases the risk of illegality such as falsification of the term of validity of the access token. The online authentication has a problem of inconvenience, while the offline authentication does not have a sufficient measure against illegality. By taking into account such problems, an object of the present disclosure is to achieve authentication that takes advantages of online authentication and offline authentication.

According to one aspect of the present disclosure, there is provided an authentication system that performs authentication to use an application in a client connected with a server via a network. The server comprises a token issuer configured to generate an offline token, which is used for authentication when the client is offline, as a token for permitting use of the application, in response to an authentication request from the client and to send the offline token to the client, wherein the offline token includes static date and time information that indicates a validity period for the use of the application and dynamic date and time information that is updated when authentication is performed; and a token manager configured to manage the generated token. The client comprises a token holder configured to keep the offline token; a use permission unit configured to permit the use of the application when current time is after the dynamic date and time information included in the offline token and within the validity period, and to otherwise prohibit the use of the application; and a date and time information updater configured to update the dynamic date and time information to the current time, accompanied with operation of the use permission unit.

Each of the token holder, the use permission unit and the date and time information updater provided in the client may be configured separately from the application or may be incorporated as part of the application.

The above aspect of the present disclosure uses the offline token issued by the server to permit or prohibit the client to use or from using the application. At the time of issuing the offline token, the client needs to be connected with the server via the network. After that, even when the client is not connected with the server, the client is allowed to use the application. This configuration thus ensures the convenience.

Furthermore, the online token used in the aspect of the present disclosure includes the static date and time information indicating the validity period and the dynamic date and time information updated when authentication is performed, as the dates and times for determining the validity. The static date and time information used may be information regarding, for example, the last date and time when the offline token is usable, the date and time when the use of the offline token is allowed to start or the date and time when the offline token is issued, or a time period from the start of the use of the offline token to the expiration of the use. All or part of these pieces of information may be used. The dynamic date and time information used may be, for example, the date and time when authentication is performed, the date and time when the application is used, and an elapsed time since the start of the use of the offline token. The authentication system of this aspect determines that the use of the application is to be permitted, upon satisfaction of the two conditions, i.e., the condition that the current time is after the dynamic date and time information and the condition that the current time is within the validity period. The current time used here may be a time based on the client's timepiece. Even when the client's timepiece is made to go back in time after expiration of the validity period, the condition that the current time is after the dynamic date and time information is not satisfied. Using the dynamic date and time information in addition to the static date and time information thus prevents the illegal use of the offline token.

Accordingly, the configuration of the present disclosure has the advantageous effects of providing the convenience in the offline use of the application while suppressing the illegality.

In the above aspect of the present disclosure, the date and time information updater may be subjected to a control (i.e., under a restriction) that allows the dynamic date and time information to be updated only toward a future.

This configuration prevents the illegality of causing the dynamic date and time information to go back in time and more effectively avoids the illegal use of the application.

In the aspect of controlling the update of the date and time information, the date and time information updater may eliminate the control when the client is online and may synchronize the dynamic date and time information with date and time obtained via the network.

When the dynamic date and time information is mistakenly set to wrong date and time, this configuration enables the wrong dynamic date and time information to be corrected. For example, when the client's timepiece is changed to future date and time after the validity period for some reason, the dynamic date and time information is likely to be updated to the future date and time. Even when the true current time is within the validity period, such update causes a failure in using the application based on the offline token. The dynamic date and time information is not readily made to go back in time, for the purpose of preventing the illegality. In this case, there is a possibility that the use of the application is not permitted to restart even when the client's timepiece is restored to normal.

When the client is online, the above aspect exceptionally allows the dynamic date and time information to go back to be synchronized with the correct time. This accordingly allows for recovery of the use of the application.

In the above aspect of the present disclosure, the server may comprise an authenticator configured to perform authentication of determining whether the use of the application in the client is to be permitted or prohibited, based on at least one of validity of a client-specific online token, which is used for authentication when the client is online, and a start condition for permitting start of the application, in response to the authentication request from the client. The client may comprise an authentication request transmitter configured to repeatedly send the authentication request to the server at a start of the application and at predetermined timings after the start. In the server, the token issuer may send either a valid client-specific online token or information indicating that an issued online token, which is issued in advance to the client, is valid, to the client, when the use of the application is permitted by the authentication. When there is an issued online token that is issued in advance to the client in response to the authentication request and that is different from an online token newly generated by the token issuer, the token manager may invalidate the issued online token according to a predetermined invalidation condition. In the client, the use permission unit may permit the use of the application only when confirming that the online token is valid and otherwise prohibit the use of the application.

The above aspect provides authentication in the state that the client is connected to the network, i.e., online authentication. More specifically, the server performs authentication, in response to the authentication request from the client. This authentication is performed when the application is newly started in the client and when the application is already in use in the client. In the latter case, the client sends the authentication request to the server at regular intervals during the use of the application without the user's instructions.

In the case of giving permission for the use of the application, the server sends information such as the online token to the client. For example, when the application is newly started in the client, the server issues a new online token and sends the new online token to the client. Identification information on the online token may be sent in place of the online token itself.

When the application is already in use in the client, on the other hand, the server sends information indicating that the existing online token is valid to the client. According to a modification, the server may issue a new online token that is to replace the existing online token, and send the new online token to the client.

The client receives the valid online token (this includes its identification information or the information indicating that the online token is valid) and gives permission for the use of the application.

Furthermore, in the above aspect of the present disclosure, when an authentication request is sent from a different client, the server invalidates the issued online token and subsequently issues a new online token. Invalidation of the issued online token causes the previous terminal using the application to be unable to use the application. Accordingly, when the user desires to change the terminal used, this configuration enables the user to readily change the terminal only by sending the authentication request from a new terminal without stopping the use of the application in the previous terminal.

For the purpose of determining whether an authentication request is sent from a different terminal from the terminal for which the online token has already been issued, the above aspect of the present disclosure provides the client-"specific" online token. For example, identification information intrinsic to the client's terminal may be included in the online token, or the online token may be managed in relation to the identification information of the client.

In the above aspect of the present disclosure, the authentication request may include identification information of a developer of the application, identification information of the application, account information of a user of the application, and terminal identification information of the client. The authentication may be performed by taking into account consistency of the respective information included in the authentication request with information registered in advance in the server.

This configuration provides the system performing authentication without confusion with respect to a plurality of developers, a plurality of applications, a plurality of users and a plurality of client terminals. For example, including the identification information of the developer of the application in the authentication request allows for recognition that the authentication request is related to the developer, even when the other pieces of information (the identification information of the application, the account information and the terminal information are identical. This configuration thus enables each developer to arbitrarily set the identification information of the application and the account information without taking into account what identification information of the application and what account information are used by other developers.

In the above aspect of the present disclosure, the server may comprise a database that is provided individually for each developer of the application and that stores identification information of the application and account information of the user.

This configuration allows for data management with regard to each developer of the application and further improves the convenience of the present disclosure.

The present disclosure may not necessarily have all the features described above but may be configured by appropriately omitting or combining part of the features. The present disclosure is not limited to the aspects of the authentication system described above but may be configured by other aspects.

One example is an authentication method of performing authentication to use an application in a client connected with a server via a network.

A process performed by the server includes (a) a step of generating an offline token, which is used for authentication when the client is offline, as a token for permitting use of the application, in response to an authentication request from the client and sending the offline token to the client, wherein the offline token includes static date and time information that indicates a validity period for the use of the application and dynamic date and time information that is updated when authentication is performed, and (b) a step of managing the generated token.

A process performed by the client includes (c) a token holding step of keeping the offline token, (d) a use permission step of permitting the use of the application when current time is after the dynamic date and time information included in the offline token and is within the validity period, while otherwise prohibiting the use of the application, and (e) a date and time information updating step of updating the dynamic date and time information to the current time, accompanied with the use permission step.

The various features described above with respect to the authentication system may also be incorporated in the authentication method.

Another aspect may be configured as a computer program that causes a computer to implement the authentication method described above or may be configured as a computer readable recording medium in which such a computer program is recorded. The computer program may be configured to be installed in the server or may be configured to be installed in the client.

An example of the latter aspect is a non-transitory computer-readable storage medium with a computer program stored therein, wherein the computer program is executable by a client connected with a server via a network to perform authentication to use an application in the client.

The computer program causes the client to implement (i) a function of sending an authentication request to the server, (ii) a function of receiving from the server an offline token, which is used for authentication when the client is offline, as a token for permitting use of the application, wherein the offline token includes static date and time information that indicates a validity period for the use of the application and dynamic date and time information that is updated when authentication is performed, (iii) a use permission function of permitting the use of the application when current time is after the dynamic date and time information included in the offline token and within the validity period, while otherwise prohibiting the use of the application, and (iv) a date and time information updating function of updating the dynamic date and time information to the current time, accompanied by execution of the use permission function.

The various features described above with respect to the authentication system may also be incorporated in the computer program. The computer program executed by the client may be provided as a separate computer program from the application used in the client or may be provided to be incorporated in the application.

DETAILED DESCRIPTION OF EMBODIMENTS OF THE INVENTION

A. System Configuration

Figure 1:
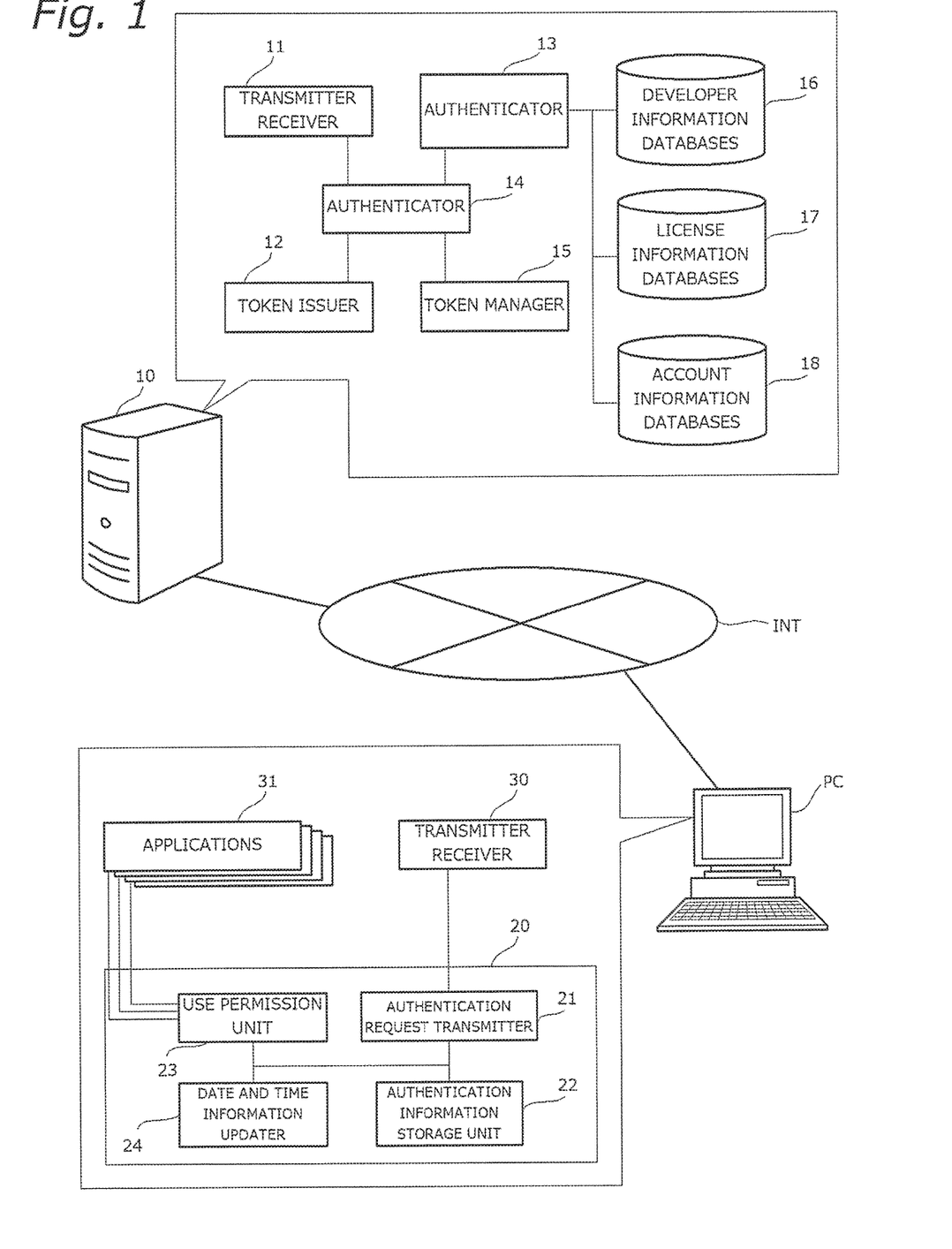
FIG. 1 is a diagram illustrating the configuration of an authentication system according to an embodiment.

The following describes an embodiment of the present disclosure. FIG. 1 is a diagram illustrating the configuration of an authentication system according to an embodiment. The authentication system denotes a system that causes a server 10 to provide authentication to use an application installed in a client PC in an environment where the client PC and the server 10 are connected to the Internet INT. Hereinafter authentication via the network may be called "cloud authentication".

Only one client PC is illustrated in FIG. 1, but there may be a plurality of client PCs. The client PC is a computer that includes a CPU and memories and that is configured to perform various applications. The client PC used may be a tablet, a smartphone, or a cell phone, as well as a personal computer.

The authentication system is established by the functions provided in the server 10 and an authentication system module 20 provided in the client PC. According to the embodiment, the authentication system is implemented as a software configuration by installing computer programs for providing illustrated respective functional blocks in the sever 10 and in the client PC, but may be at least partly implemented as a hardware configuration. The respective functional blocks shown in the server 10 may be implemented by distributed processing by a plurality of servers.

The authentication system of the embodiment may be used, for example, in an aspect described below. A developer of an application provides users with a right to use the application, i.e., a license, for a price to gain a profit. In order to gain such a profit properly, there is a need to prevent illegal use of the application by unauthorized users. There is accordingly a need for authentication to identify whether the user has a valid license at the time of using the application. The authentication system of the embodiment provides such authentication. This authentication system may be constructed and operated by the developer itself of the application, but this embodiment describes the case where an operating entity other than the developer operates the authentication system. The developer concludes a service contract for the authentication system with the operating entity of the authentication system and provides the authentication system module 20, which is to be installed in the client PC. This authentication system module 20 may be incorporated in the application developed by the developer or may be provided as a separate module from the application. The user licensed to use the application from the developer installs the application in the user's own client, so as to simultaneously install the authentication system module 20. The application is accordingly operated under authentication by the authentication system of the embodiment.

The following describes the respective functional blocks provided in the server 10. The server 10 is provided with three different types of databases, developer information databases 16, license information databases 17 and account information databases 18. The developer information database 16 stores information on a developer of an application using the authentication system. The license information database 17 and the account information database 18 are databases provided with respect to each developer. The license information database 17 stores information on, for example, each user who purchases a license for the application and license conditions. The account information database 18 stores information on an account (also called user ID) usable by each licensed user. The details of these databases will be described specifically later.

A database manager 13 is configured to manage reading and writing data from and into the developer information databases 16, the license information databases 17 and the account information databases 18. A transmitter receiver 11 is configured to send and receive various information via the Internet INT. According to the embodiment, the information to be sent and received include, for example, an authentication request for demanding authentication to use the application and a token for permitting the use.

An authenticator 14 is configured to authenticate the application, along with serving to consolidate the respective functional blocks provided in the server 10. According to the embodiment, authentication is performed repeatedly during the use of the application, in addition to at the start of the application as described later. The authenticator 14 receives an authentication request from the client PC and determines whether the application is available or unavailable by referring to the information stored in the developer information databases 16, the license information databases 17, the account information databases 18, a token manager 15 and the like at respective timings.

A token issuer 12 is configured to issue a new token as needed basis when the use of the application is permitted as a result of the authentication by the authenticator 14. The token is one-time or throwaway information for permitting the client PC to use the application. The token manager 15 keeps the issued token.

The following describes the respective functional blocks provided in the client PC.

A transmitter receiver 30 is configured to send and receive various information via the Internet.

Applications 31 are various computer programs used in the client PC. The applications 31 include those subject to authentication of the embodiment, as well as those not subject to authentication. In the following description of the embodiment, the application 31 denotes an application subject to authentication of the embodiment.

The authentication system module 20 is a module that cooperates with the server 10 to establish the authentication system of the embodiment. The authentication system module 20 may be provided as a separate module from the applications 31 or may be incorporated in each of the applications 31.

An authentication request transmitter 21 is configured to send information demanding for authentication (hereinafter called authentication request) to the server 10. The authentication request transmitter 21 sends the authentication request when an application is newly started in the client PC. The authentication request is repeatedly sent at predetermined timings irrespective of the user's instruction, during the use of the application.

An authentication information storage unit 22 is configured to temporarily store information included in the authentication request. The information included in the authentication request includes terminal-specific identification information of the client PC. When a token is issued by the server 10 in response to an authentication request for the application, the authentication information storage unit 22 also stores the token.

A use permission unit 23 is configured to permit the use of the application 31 when authentication is provided by the server 10. According to the embodiment, a standalone mode is provided to perform authentication in the state that the client PC is not connected with the server 10. In the standalone mode, the use permission unit 23 serves to determine whether the application 31 is available or unavailable, based on the information stored in the authentication information storage unit 22 or more specifically based on an offline token.

A date and time information updater 24 is configured to update "date and time of the use" information included in the offline token stored in the authentication information storage unit 22 in the standalone mode. The "date and time of the use" is information for preventing the illegal use of the offline token as described later. The date and time information updater 24 updates the date and time of the use at a predetermined timing, for example, at the time of performing authentication in the standalone mode.

B. Configuration of Databases

Figure 2:
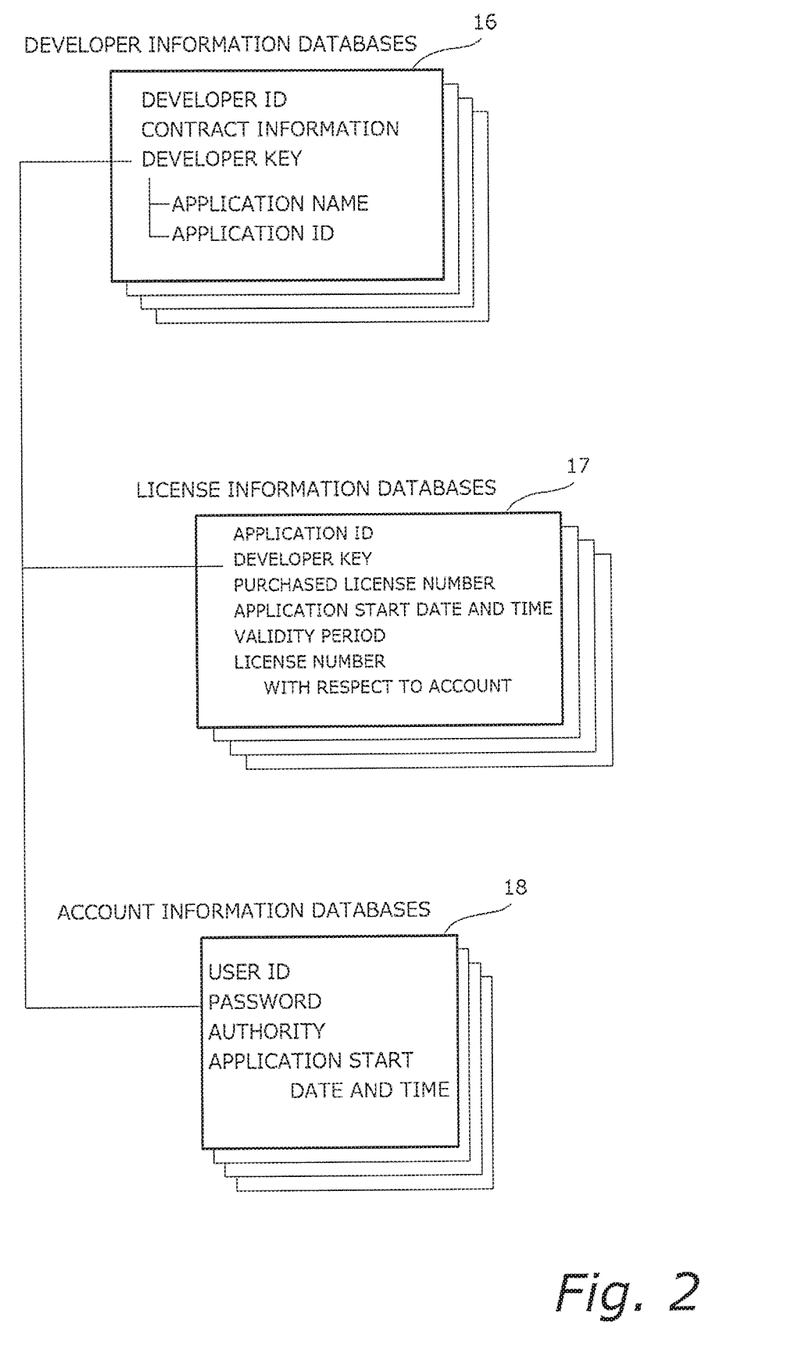
FIG. 2 is a diagram illustrating the configuration of databases.

FIG. 2 is a diagram illustrating the configuration of databases. The developer information database 16 is a database configured to store information on a developer of an application using the authentication system.

A developer ID is identification information of the developer. Contract information denotes information relating to an operating entity of the authentication system and a contract with the developer. The contract information includes, for example, the name of the developer, the point of contact, terms of the contract, charging information and payment information. A developer key is information is developer-specific information used in authentication of the application. The developer key may be information identical with the developer ID, but different information is used as the developer key according to the embodiment.

An application name and an application ID denote the name and the identification information of the application that is subject to authentication of the embodiment. A plurality of application names and a plurality of application IDs may be provided for each developer. The developer information database 16 stores information with respect to each developer, so that the application name and the application ID of one developer may be identical with the application name and the application ID of another developer. According to the embodiment, however, in order to avoid confusion, when an application is newly registered by a developer, the authentication system allocates intrinsic identification information, which does not overlap with those allocated to any applications of the other developers, to the application.

The license information database 17 and the account information database 18 are databases provided with respect to each developer. The license information database 17 stores information on, for example, each user who purchases a license for the application and license conditions. Illustrated data are provided for each license purchased by the user.

An application ID is identification information of the application subject to the license. This is information corresponding to the application ID stored in the developer information database 16. A developer key is information indicating the developer and is identical with the information stored in the developer information database 16.

A purchased license number is information indicating the number of licenses purchased by the user, i.e., the number permitting the user to use the application simultaneously. Information indicating the number permitting the user to install the application in the computer may be added. An application start date and time indicates the date and time when the user is permitted to use the application by providing the license. A validity period denotes a term of validity of the license, i.e., a time period when the user is permitted to use the application. A license number with respect to an account indicates the number permitting the user to use the application simultaneously by one account, i.e., by one user ID.

The account information database 18 stores information on an account (also called user ID) usable by each licensed user. For example, when a company receives a license to allow a plurality of employees to use the application, multiple pieces of account information may be correlated to one piece of license information.

A user ID is identification information of each user of the application, and a password is information that is to be entered in an authentication screen for the use of the application. An authority denotes the authority permitted to the user for the use of the application. According to the embodiment, a standalone mode that allows for authentication even in the offline state that the client is not connected with the server is provided, in addition to online authentication performing authentication of the application in the state that the cline is connected with the server. The availability of the standalone mode may be set in the authority. An application start date and time indicates the date and time when each user is permitted to use the application.

In any of these databases, there is no need to include all the illustrated pieces of information, but part of the information may be omitted as the needed basis. Different pieces of information other than those illustrated may be added to the database. The license information database 17 and the account information database 18 are separately provided according to the embodiment, but may be provided as an integral database.

C. Configuration of Token

The following describes the configuration of the token used for authentication of the embodiment. The token is one-time or throwaway information for permitting the client PC to use the application. Information constituting the token may be set arbitrarily, but the token may include the following pieces of information according to the embodiment: a "token ID" that is identification information of the token; the "application ID" and the "developer key" that are stored in the license information database 17; a "license type" that is information indicating either online authentication or standalone; the "user ID" stored in the license information database 18; information such as a "date and time of the use", a "validity period", and a "changeover date and time" as pieces of information used in the standalone mode, the meanings of these pieces of information will be described later; a "terminal ID" of the client that is hardware-specific identification information; and optionally other pieces of management information.

D. Online Authentication

Figure 3:
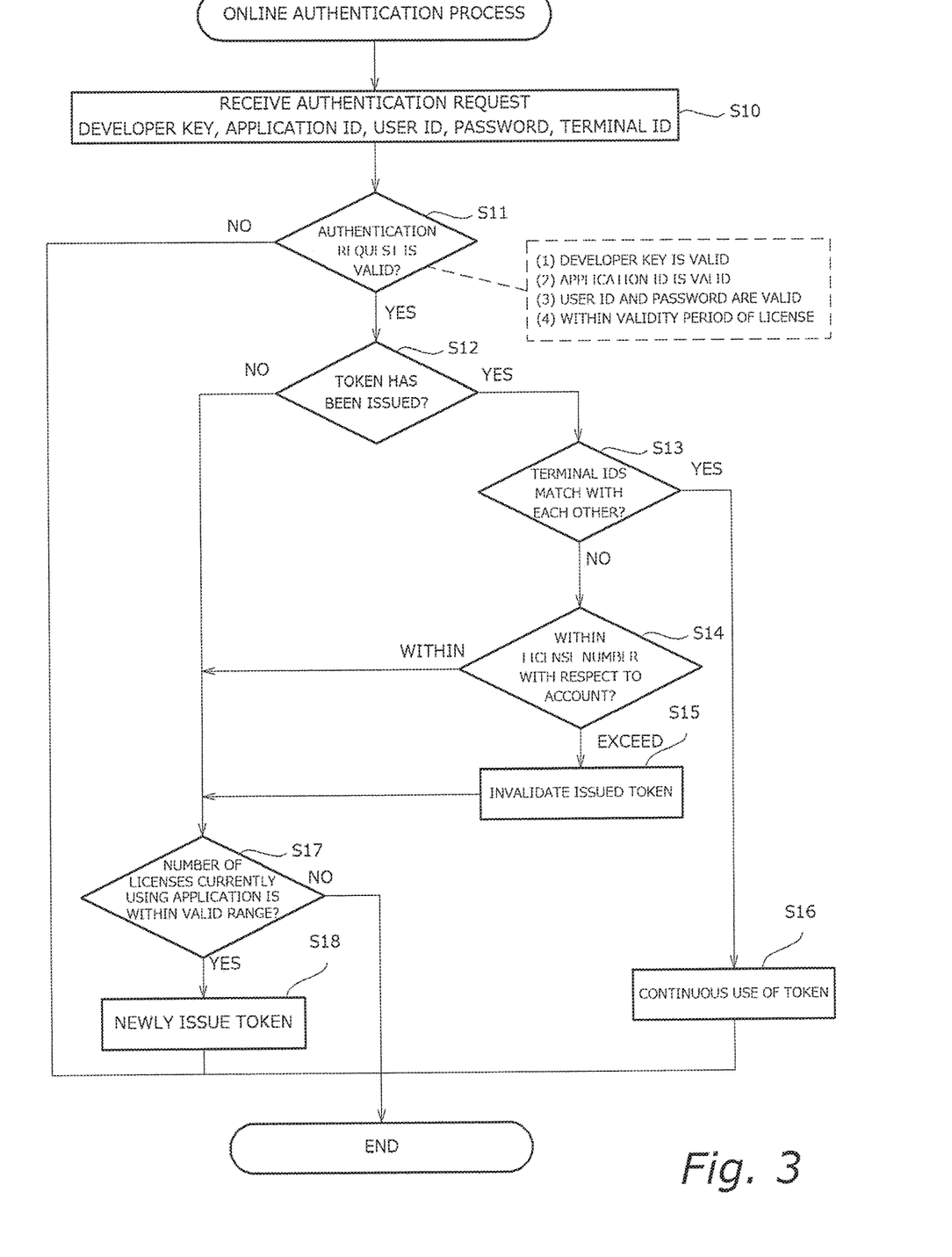
FIG. 3 is a flowchart showing a network authentication process.

The following sequentially describes authentication processes by the authentication system of the embodiment. FIG. 3 is a flowchart showing an online authentication process. The online authentication denotes an authentication process that is performed in the state that the client and the server are communicable with each other via the Internet. This process is performed by the server when an authentication request is sent from the client to the server. The authentication request is sent when the user newly starts the application or when the user already uses the application. In the latter case, the client automatically sends the authentication request to the server at predetermined timings, irrespective of the user's instruction.

The server first receives an authentication request (step S10). The authentication request includes the developer key, the application ID, the user ID, the password, and the terminal ID. Including the developer key and the application ID allows for confirmation that the received authentication request is an authentication request from an authorized application that is created by a qualified developer who concludes a contract to use the authentication system. Including the developer key enables information arbitrarily set with respect to each developer to be used for the application ID, the user ID and the password without taking into account the possible overlap with those of another developer. The user ID, the password and the like may, however, be developer-independently usable information in the authentication system.

In the case of the authentication request sent during the use of the application, the information such as the user ID and the password may be omitted. A token issued in the process of authentication may be used, in place of the information such as the developer key and the application ID.

The terminal ID is client-specific information, and SecureUDID that is intrinsic information to a combination of a client and an application is used for the terminal ID according to the embodiment. Otherwise, a MAC address or the like may be used for the terminal ID. Using the terminal ID advantageously enables the server to identify the client that has sent an authentication request even when a plurality of clients are connected to the Internet.

The server subsequently determines whether the authentication request is valid or not (step S11). According to the embodiment, it is determined that the authentication request is valid when the following four conditions are satisfied:

Condition (A1) is that the developer key is effective or more specifically that the developer key included in the authentication request matches with the information stored in the developer information database 16;

Condition (A2) is that the application ID is valid or more specifically that the application ID included in the authentication request matches with the information stored in either the developer information database 16 or the license information database 17;

Condition (A3) is that the user ID and the password are valid or more specifically that these pieces of information match with the information stored in the account information database 18; and Condition (A4) is that the current time is in the validity period of the license or more specifically that the time of authentication is consistent with the "validity period" information stored in the license information database 17.

In the case of the authentication request sent during the use of the application, the condition (A3) may be omitted.

When any of the above four conditions is unsatisfied and it is determined that the authentication request is invalid (step S11), the server does not permit the use of the application and terminates the online authentication process. When it is determined that the authentication request is valid (step S11), on the other hand, the server retrieves the issued tokens stored in the token manager 15 (shown in FIG. 1) and determines whether a token has been issued corresponding to the authentication request. The token corresponding to the authentication request means a token having the matching developer key, application ID and user ID.

When the corresponding token has not yet been issued (step S12) and the number of the licenses currently using the application is within a valid range (step S17), the server newly issues a token (step S18). When receiving the token, the client is permitted to use the application. When the number of the licenses currently using the application exceeds the valid range (step S17), the server does not permit the use of the application and terminates the online authentication process.

The determination of whether the number of the licenses currently using the application exceeds the valid range (step S17) may be performed by the following procedure. The procedure retrieves a token having a developer key and an application ID matching with the authentication request, from the tokens stored in the token manager 15 and thereby determines the number of the licenses currently using the application. When this number of the licenses currently using the application is less than the purchased license number stored in the license information database 17, newly permitting the use of the application does not cause the number of the licenses currently using the application to exceed the purchased license number. It is thus determinable that the number of the licenses currently using the application will be in the valid range. When this number of the licenses currently using the application is equal to the storage of the license information database 17, it is determinable that the number of the licenses currently using the application will exceed the valid range.

When the token corresponding to the authentication request has already been issued (step S12), on the other hand, the server determines whether the terminal ID included in the issued token matches with the terminal ID included in the authentication request (step S13).

When both the terminal IDs match with each other, the server determines that the authentication request is sent in a repeated manner during the use of the application by the client that has received the issued token and performs a process for the continuous use of the token (step S16). For example, the server may send again the token stored in the token manager 15 to the client or may send information indicating that the issued token is valid.

When the terminal IDs included in the issued token and included in the authentication request do not match with each other (step S13), the server determines that the user sends the authentication request from a different terminal and performs the following process. The server first checks the license number with respect to the account (step S14). More specifically, the server obtains the number of tokens having the user ID that is included in the authentication request, from the token manager 15, determines the number of the licenses currently using the application by the account from which the authentication request is sent, and compares the number of the licenses currently using the application with the license number with respect to the account stored in the license information database 17.

As a result, when it is determined that the number of the licenses currently using the application is within the license number with respect to the account (step S14), the server performs the processing of step S17 described above to determine whether the application is available or unavailable. When it is determined that the number of the licenses currently using the application exceeds the license number with respect to the account (step S14), on the other hand, the server invalidates the issued token (step S15), stops the current use of the application and then performs the processing of step S17 described above to determine whether the application is available or unavailable.

As described above, the issued token is invalidated, in response to the authentication request that includes the same user ID but includes the different terminal ID. This advantageously enables the user to readily use the application at a different terminal without stopping the use of the application.

The token including the matching user ID that matches with the authentication request is subject to this invalidation of the token, and the token including the different user ID is not subject to the invalidation of the token. Accordingly, priority is given to the terminal using the application earlier in the case of the different user ID, while being given to the terminal authenticated later in the case of the matching user ID.

E. Standalone Authentication

Figure 4:
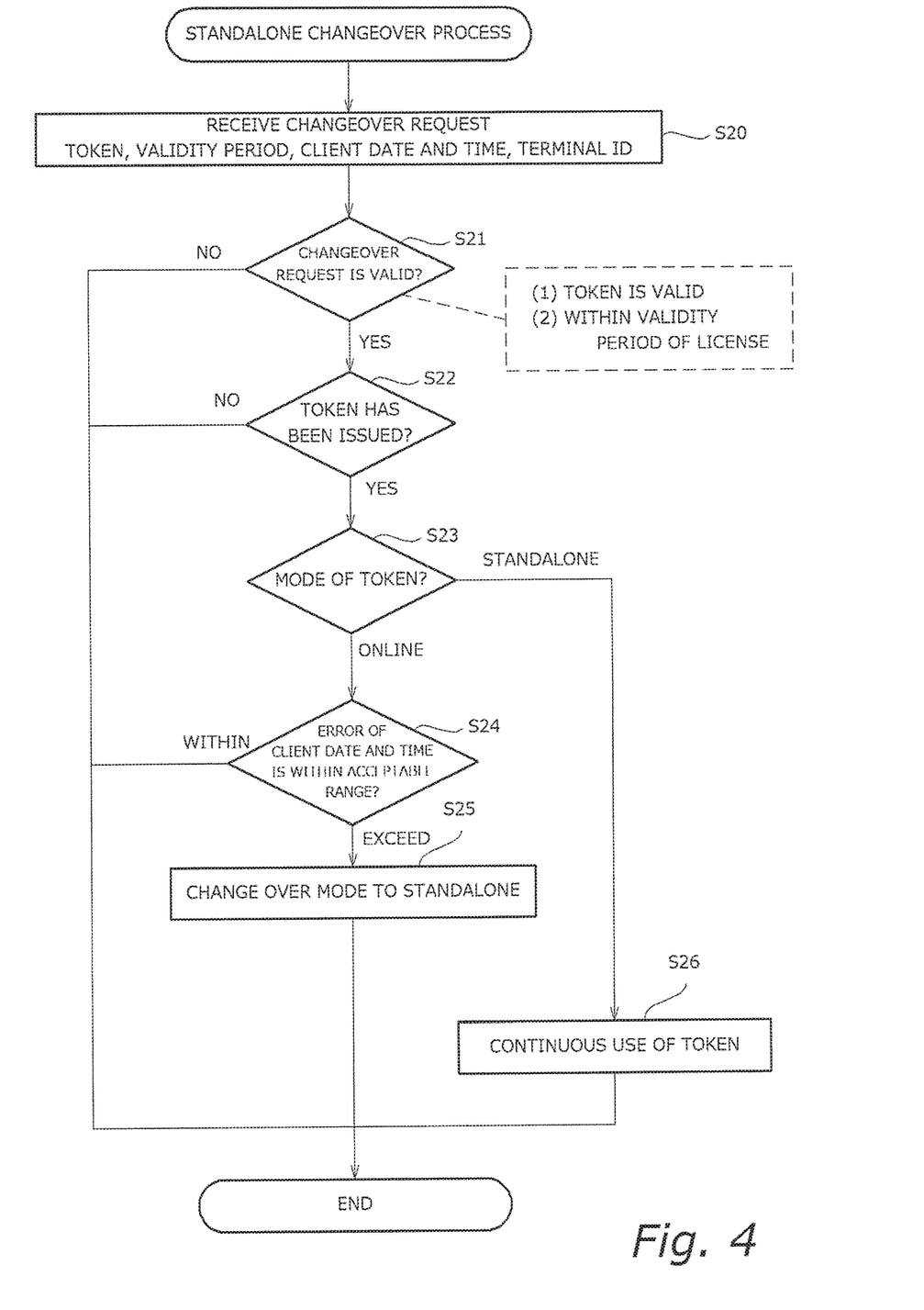
FIG. 4 is a flowchart showing a standalone changeover process.

FIG. 4 is a flowchart showing a standalone changeover process. This is a process of changing over to the standalone mode that allows for the use of the application even in offline, after the online authentication. This process is performed by the server when the user ends a changeover request from the client to the server.

The server first receives a changeover request (step S20). The changeover request includes information on a token, a validity period, a client date and time, and a terminal ID. The token denotes a token issued by the online authentication. According to the embodiment, the changeover to the standalone mode is performed after the online authentication, so that the token may be included in the changeover request. Authentication in the standalone mode may be approved. Even in this case, however, at the time of starting the application, the client is to be connected with the server, for the purpose of receiving the token. It is accordingly sufficient to automatically shift the processing to the standalone changeover process after performing the online authentication (shown in FIG. 3) as described above.

The validity period denotes a term of validity of the token. The client date and time is date and time information based on the client's timepiece. The terminal ID is identical with the terminal ID in the online authentication process. The changeover request may also include, for example, information on a time period when the user desires the use of the application in the standalone mode.

The server subsequently determines the validity of the received changeover request (step S21). According to the embodiment, it is determined that the received changeover request is valid when the following two conditions are satisfied:

Condition (B1) is that the token is valid. This means that the token included in the changeover request is not invalidated but is managed by the token manager 15 of the sever (shown in FIG. 1); and Condition (B2) is that the current time is in the validity period of the license. This means that the current time does not exceed the validity period stored in the license information database 17. When the license exceeds the validity period, there is no need to permit the changeover to the standalone mode.

When either one or both of the conditions (B1) and (B2) are unsatisfied and it is determined that the changeover request is invalid (step S21), the server does not permit the changeover and terminates this process.

When the changeover request is valid (step S21), the server determines whether a valid token has been issued for the application that is subject to the request for changing over to the standalone mode (step S22). When the valid token has not yet been issued, the server determines that the online authentication is not completed and thereby terminates this process without permitting the changeover.

When the valid token has been issued (step S22), the server determines whether the issued token is for the standalone mode (step S23). When the issued token is for the standalone mode, the server permits the continuous use of the token (step S26). Accordingly, the server does not newly permit the changeover request but sends again the issued token or sends information indicating that the issued token is available.

When the issued token is for the online authentication (step S23), on the other hand, the server performs a process for changing over to the standalone mode by the following procedure. The server first obtains the date and time of the client's timepiece and determines whether an error of the client date and time is within an acceptable range (step S24). According to the embodiment, in authentication in the standalone mode, the date and time information stored in the token is used to prevent illegal use of the application by the user as described later. When the client's timepiece has a large error at the time of the changeover to the standalone mode, it is likely to fail in preventing illegal use of the application. Accordingly, when the error exceeds the acceptable range (step S24), the server does not permit the changeover to the standalone mode. Only when the error is within the acceptable range, the server performs the changeover to the standalone mode (step S25) and terminates this process. The "acceptable range of the error" used as the criterion for determining whether the changeover is to be permitted is an arbitrarily set value in terms of preventing illegal use.

An offline token indicating the standalone mode is sent to the client for the changeover to the standalone mode. The offline token includes, for example, information on a changeover date and time to the standalone mode, a validity period for the use in the standalone mode, and a date and time of the use. The changeover date and time and the validity period are static date and time information set at the time of the changeover to the standalone mode. The date and time of the use is, however, information indicating the date and time of the last authentication using the offline token and is dynamic date and time information that is updated accompanied with the use of the offline token. The client keeps this offline token in the authentication information storage unit 22 (shown in FIG. 1).

Figure 5:
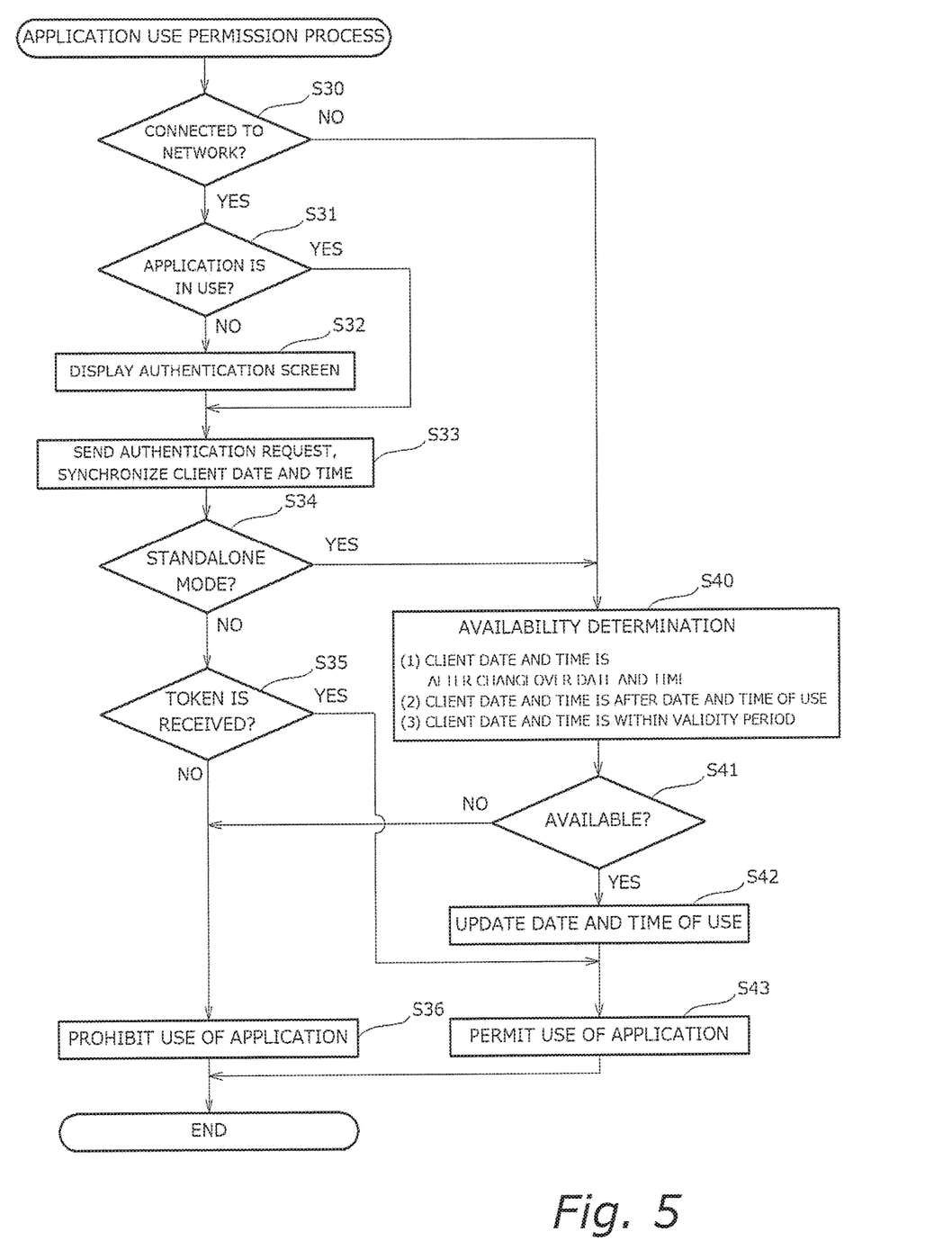
FIG. 5 is a flowchart showing an application use permission process.

FIG. 5 is a flowchart showing an application use permission process. This process is performed by the client when the client uses the application. This process is performed when the application is newly started or when the application is already in use and is also performed when the client is online or when the client is standalone. During the use of the application, this process may be performed, for example, at predetermined cycles or may be triggered by the user's specific operation in the application.

In this process, when the client is connected to a network (step S30) and the application is not in use (step S31), i.e., when the application is to be newly started, the client displays an authentication screen (step S32). The authentication screen denotes a screen for entry of authentication information such as the user ID and the password. The client sends an authentication request including the entered authentication information to the server and synchronizes the client's timepiece with the server's timepiece (step S33).

When the application is already in use (step S31), the client sends an authentication request to the server with skipping the display of the authentication screen and synchronizes the client's timepiece with the server's timepiece (step S33). In this case, information on the user ID and the password may be omitted from the authentication request.

Synchronizing the client's timepiece at step S33 is attributed to the following reason. According to the embodiment, in the standalone mode, the date and time information (called the date and time of the use) recorded in the token is used to prevent illegal use of the application. From this point of view, it is preferable to synchronize the client's timepiece with the server's timepiece. In the standalone mode, the information on the date and time of the use of the token is synchronized, along with the synchronization of the timepiece. The significance of such synchronization will be described later.

After sending the authentication request, when the client is not in the standalone mode (step S34), the client waits for completion of authentication by the server. In the case where no token is received from the server (step S35), the client prohibits the use of the application (step S36) and terminates this routine. The case where no token is received (step S35) includes, for example, the case where no token is received in a predetermined waiting time and the case where information indicating a failure of authentication is received from the server.

In the case where the token is received from the server (step S35), on the other hand, the client permits the use of the application (step S43) and terminates this process. The use of the application is permitted in both the case where the application is newly started and the case where the application in use is allowed to be continuously used. The received token is kept in the authentication information storage unit 22 (shown in FIG. 1).

When the client is in the standalone mode (step S34), the client performs availability determination (step S40). The availability determination is also performed when the client is not connected to the network (step S30). The availability determination denotes determining whether the use of the application is permitted or prohibited.

The client refers to the offline token kept in the authentication information storage unit 22 and determines that the use of the application is permitted when the following three conditions are satisfied:

Condition (C1) is a condition that the client date and time is after the changeover date and time. The client date and time denotes the date and time of the client's timepiece. The changeover date and time denotes the date and time when the mode is changed over to the standalone mode. These pieces of information are recorded in the offline token.

Condition (C2) is a condition that the client data and time is after the date and time of the use. The date and time of the use denotes the date and time of the last authentication using the offline token.

Condition (C3) is a condition that the client date and time is within the validity period.

When the offline token is not kept in the authentication information storage unit 22, this means that the standalone mode is not permitted. In this case, all the above three conditions are unsatisfied, so that it is determined that the application is unavailable.

Among the above conditions, the conditions (C1) and (C3) are determination based on static date and time information indicating the changeover date and time and the validity period. If it is determined whether the application is available or unavailable based on only these conditions, the conditions (C1) and (C2) are readily satisfied by going back in time on the client's timepiece after expiration of the validity period. This results in illegal use of the application.

The condition (C2), on the other hand, uses dynamic date and time information that is updated at every time of authentication using the offline token. The date and time information of the condition (C2) is updated to approach the validity period accompanied with the use the offline token. This gradually narrows the time duration that satisfies the conditions (C2) and (C3). After expiration of the validity period, there may be no time duration satisfying the conditions (C2) and (C3). The combined use of the dynamic date and time information to determine whether the application is available or unavailable advantageously prevents illegal use.

According to the embodiment, with a view to further enhancing this function, the information on the date and time of the use is basically allowed to be updated only toward a future and is not allowed to go back in time.

When any of the conditions (C1) to (C3) is unsatisfied, the client determines that the application is unavailable (step S41) and prohibits the use of the application (step S36). When all the conditions (C1) to (C3) are satisfied, the client determines that the application is available (step S41), updates the date and time of the use (step S42) and permits the use of the application (step S43).

Figure 6A:
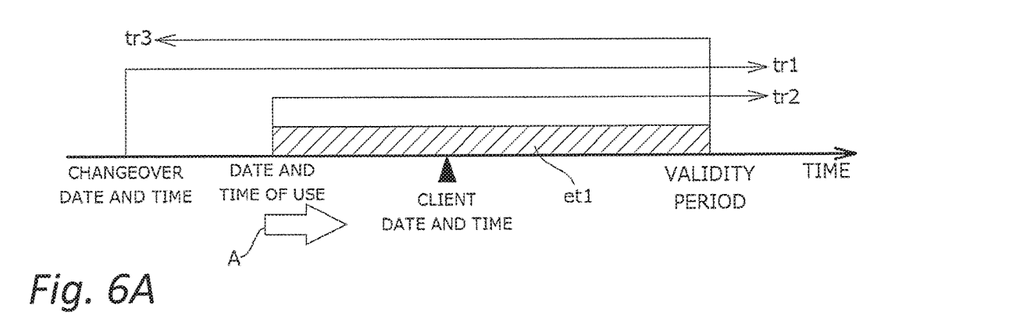
FIGS. 6A through 6C are diagrams illustrating the details of updating the date and time of the use.
Figure 6B:
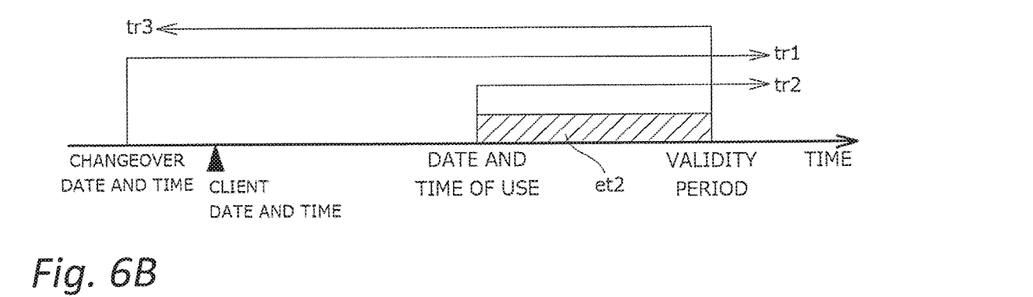
Figure 6C:
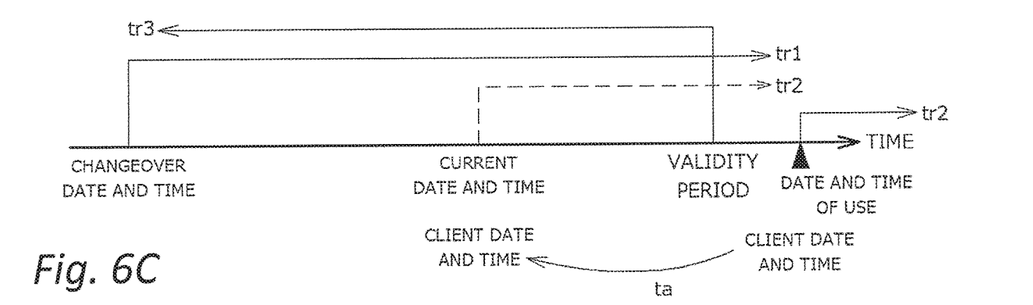

The following describes the significance of the conditions (C1) to (C3) described at step S40. FIGS. 6A through 6C are diagrams illustrating the details of updating the date and time of the use.

FIG. 6A shows the conditions (C1) to (C3) at step S40 in the application use permission process (shown in FIG. 5). The condition (C1) is satisfied when the client date and time indicated by a closed triangle is in a range after the changeover date and time as shown by an arrow tr1. The condition (C2) is satisfied when the client date and time is in a range after the date and time of the use as shown by an arrow tr2. The condition (C3) is satisfied when the client date and time is in a range before the validity period as shown by an arrow tr3. As a result, the conditions (C1) to (C3) are satisfied when the client date and time is present in a hatched range et1. The date and time of the use is updated only toward a future, accompanied with the use of the offline token as shown by an arrow A.

Updating the date and time of the use gradually narrows a range et2 satisfying the conditions (C1) to (C3) as shown in FIG. 6B. In this state, even when the client date and time is intentionally set in the past as illustrated, the application is unavailable since the condition (C2) based on the date and time of the use is unsatisfied.

The date and time of the use contributes to prevent illegal use in the standalone mode as described above. Setting the client date and time to a future date and time for any reason provides the state shown in FIG. 6C. For example, when the client date and time is set to a date and time after the validity period, the date and time of the use of the offline token is also set to the date and time after the validity period on the occasion of authentication. There is accordingly no range that satisfies all the conditions of the arrows tr1 to tr3. As a result, use of the application is not permitted.

In order to eliminate this state, there is a need to correct the date and time of the use to the true date and time. According to the embodiment, the date and time of the use is basically allowed to be updated only toward a future. For example, even when the client date and time is corrected to the true date and time as shown by an arrow ta, the date and time of the use does not go back in time. There is accordingly no range that satisfies all the conditions of the arrows tr1 to tr3.

According to the embodiment, in order to avoid such a state, only when the client's timepiece is synchronized with the server's timepiece online at step S33 in the application use permission process (shown in FIG. 5), the date and time of the use is exceptionally allowed to go back in time. As a result, when the client is connected with the server, the date and time of the use is corrected to the true current date and time in FIG. 6C. The condition (C2) is accordingly in the state shown by a broken arrow tr2. This recovers a time range that satisfies all the conditions.

The authentication system of the embodiment described above provides the standalone mode and thereby allows the client in the offline state to use the application. In the standalone mode, illegal use of the application is prevented by the combined use of the static date and time information (the changeover date and time and the validity period) with the dynamic date and time information (the date and time of the use). When the user sends an authentication request from a different client in the online authentication process, the issued token is invalidated. This advantageously enables the user to start using the application in the different client without stopping the use of the application. The various features described in the embodiment may not be necessarily provided entirely, but part of the features may be omitted or combined appropriately.

The present disclosure is applicable to perform authentication for using an application in a client connected with a server via a network.

What is claimed is:

1. An authentication system that performs authentication for a user to use an application on a client connected with a server via a network, the system including:

the server comprising:
  a token issuer configured to generate an online token in response to an authentication request from the client and to send the generated online token to the client, the online token being used for authenticating the user and permitting use of the application when the client is online;
  a token manager configured to hold and manage online tokens generated by the token issuer; and
  an authenticator configured to perform authentication to determine whether the use of the application in the client is to be permitted or prohibited, based on at least one of (i) validity of a client-specific online token and (ii) a start condition for permitting start of the application, in response to the authentication request from the client; and the client comprising:
  an authentication request transmitter configured to repeatedly send the authentication request to the server at a start of the application and at predetermined timings after the start; and a use permission unit configured to permit the use of the application by the user, wherein in the server,
when the use of the application is permitted by the authenticator, the token issuer sends to the client either a valid client-specific online token or information indicating that an issued online token which was previously issued to the client is valid, and
when an online token is newly generated by the token issuer in response to the authentication request from the client, and there is a previously issued online token for the user issued to another client different from the client currently requesting the authentication, the token manager invalidates the previously issued online token according to a predetermined invalidation condition, and wherein in the client,
the use permission unit permits the use of the application only when confirming that the online token is valid, while otherwise prohibiting the use of the application.

2. The authentication system according to claim 1, wherein the authentication request includes:
identification information of a developer of the application;
identification information of the application;
account information of a user of the application; and
terminal identification information of the client,
and wherein the authentication is performed by taking into account consistency of the respective information included in the authentication request with information registered in advance in the server.

3. The authentication system according to claim 2, wherein the server comprises:
a database provided individually for each developer of the application, the database storing identification information of the application and account information of the user.

4. The authentication system according to claim 1, wherein the token issuer is further configured to generate an offline token in response to an authentication request from the client and to send the offline token to the client, the offline token being used for authenticating the user and permitting use of the application when the client is offline.

5. The authentication system according to claim 4, wherein the offline token includes:
static date and time information including a validity period for the use of the application; and
dynamic date and time information including a dynamic time and date which is updated when authentication is performed,
wherein the client further comprises:
a token holder configured to hold the offline token received from the server; and
a date and time information updater configured to update the dynamic date and time information to indicate the current time, in accordance with an operation of the use permission unit,
and wherein the use permission unit is further configured to permit the use of the application by the user if current time is after the dynamic date and time and within the validity period in accordance with the static and dynamic date and time information included in the offline token, and otherwise to prohibit the use of the application.

6. The authentication system according to claim 5, wherein the date and time information updater is under a restriction which allows the dynamic date and time information to be updated only toward a future.

7. The authentication system according to claim 6, wherein the date and time information updater eliminates the restriction when the client is online and synchronizes the dynamic date and time information with date and time obtained via the network.

8. An authentication method for performing authentication for a user to use an application on a client connected with a server via a network, the method comprising:
process steps performed by the server, comprising:
generating an online token in response to an authentication request from the client and sending the online token to the client, the online token being used for authenticating the user and permitting use of the application when the client is online.
performing authentication to determine whether the use of the application in the client is to be permitted or prohibited, based on at least one of (i) validity of a client-specific online token and (ii) a start condition for permitting start of the application, in response to the authentication request from the client;
when the use of the application is permitted by the authentication, sending to the client either a valid client-specific online token or information indicating that an issued online token which was previously issued to the client is valid; and
when an online token is newly generated in response to the authentication request from the client and there is a previously issued online token for the user which was issued to another client different from the client currently requesting the authentication, invalidating the previously issued online token according to a predetermined invalidation condition,
process steps performed by the client, comprising:
repeatedly sending the authentication request to the server at a start of the application and at predetermined timings after the start; and
permitting the use of the application only when confirming that the online token for the client is valid by receiving from the server a valid client-specific online token or information indicating that an issued online token which was previously issued to the client is valid, while otherwise prohibiting the use of the application.

9. The authentication method according to claim 8, further comprising:
generating an offline token in response to the authentication request from the client and sending the offline token to the client, the offline token being used for authenticating the user and permitting use of the application when the client is offline.

10. The authentication method according to claim 9, wherein the offline token includes static date and time information including a validity period for the use of the application, and dynamic date and time information including a dynamic time and date which is updated when authentication is performed, the method further comprising:
process steps performed by the client, including:
holding the offline token;
permitting the use of the application when current time is after the dynamic date and time and within the validity period in accordance with the static and dynamic date and time information included in the offline token, while otherwise prohibiting the use of the application; and updating the dynamic date and time information to indicate the current time, in accordance with the permitting the use of the application.

11. A non-transitory computer-readable storage medium with a computer program stored therein, wherein the computer program is executable by a client connected with a server via a network to perform authentication for a user to use an application on the client, the computer program causing the client to perform process steps comprising:

repeatedly sending an authentication request to the server to the server at a start of the application and at predetermined timings after the start;

receiving from the server, when the use of the application is permitted by the authentication in the server, either a valid client-specific online token which is used for authenticating the user and permitting use of the application when the client is online, or information indicating that an issued online token which was previously issued to the client is valid;

receiving from the server, when another online token is newly issued by the server in response to the authentication request sent from another client, information indicating that the issued online token previously issued to the client is invalid; and permitting the use of the application only when confirming that the online token for the client is valid, while otherwise prohibiting the use of the application.

12. The non-transitory computer-readable storage medium according to claim 11, wherein the process steps performed by the computer program further comprise:

receiving from the server an offline token which is used for authenticating the user and permitting use of the application when the client is offline, wherein the offline token includes:

static date and time information including a validity period for the use of the application; and dynamic date and time information including a dynamic time and date which is updated when authentication is performed;

holding the offline token;

permitting the use of the application when current time is after the dynamic date and time and within the validity period in accordance with the static and dynamic date and time information included in the offline token, while otherwise prohibiting the use of the application; and updating function of updating the dynamic date and time information to indicate the current time, in accordance with execution of the permitting the use of the application.

\* \* \* \* \*

UNITED STATES PATENT AND TRADEMARK OFFICE
CERTIFICATE OF CORRECTION

PATENT NO. : 10,693,870 B2
APPLICATION NO. : 16/175591
DATED : June 23, 2020
INVENTOR(S) : Takahiro Inabe

Page 1 of 1

It is certified that error appears in the above-identified patent and that said Letters Patent is hereby corrected as shown below:

On the Title Page

Item (73) Assignee:
Change Assignee name "SystemMetrx Co., Ltd." to --SystemMetrix Co., Ltd--.

Signed and Sealed this
Twenty-fifth Day of August, 2020

Andrei Iancu
*Director of the United States Patent and Trademark Office*